W. KECKEISSEN & F. J. REILLY.
LINE CLUTCH.
APPLICATION FILED NOV. 4, 1913.

1,122,600.

Patented Dec. 29, 1914.

Witnesses:
Charles C. Abbe
M. Dumody

Inventors
William Keckeissen
and Frank J. Reilly.
By their Attorney
H. T. Criswell

UNITED STATES PATENT OFFICE.

WILLIAM KECKEISSEN AND FRANK J. REILLY, OF NEWARK, NEW JERSEY.

LINE-CLUTCH.

1,122,600.  Specification of Letters Patent.  Patented Dec. 29, 1914.

Application filed November 4, 1913. Serial No. 799,232.

*To all whom it may concern:*

Be it known that we, WILLIAM KECKEISSEN and FRANK J. REILLY, both citizens of the United States, and residents of Newark, county of Essex, and State of New Jersey, have invented a certain new and useful Improvement in Line-Clutches, of which the following is a full, clear, and exact specification.

This invention relates to a class of devices adapted to be used especially in conjunction with clothes lines.

Our invention has for its object primarily to provide a clutch designed to be employed for detachably connecting the ends of a line in a manner whereby the line especially when used for suspending clothes therefrom, may be readily shortened or lengthened by adjusting the position of the clutch, and wherein is provided a substantially U-shaped supporting member through which the ends of the line are guided. Removably pivoted to the supporting member is a gripping element, or tongue to which one end of the line is secured against movement, and said gripping element is adapted to be swung to coöperate with the supporting member for engaging the other end portion of the line whereby the force of the pull on the line will tend to tighten the engagement of these parts therewith to prevent the line from slipping.

Another object of the invention is to provide laterally lugs upon the gripping element for permitting the clutch to be conveniently disengaged from the line as occasion requires; and a further object of the invention is to provide a form of clutch which is susceptible of being made in various sizes so as to combine great strength and durability.

A practical embodiment of the invention is represented in the accompanying drawing forming a part of this specification in which similar characters of reference indicate corresponding parts in all the views, the said invention being more fully described hereinafter, and then pointed out in the claims at the end of the description.

Figure 1:
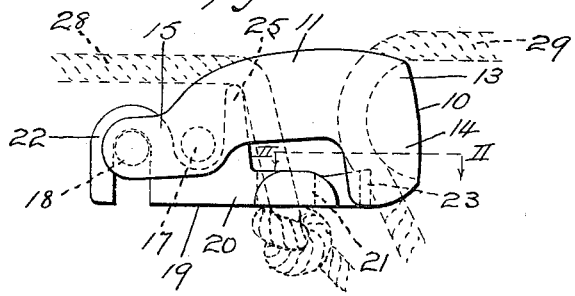
Figure 2:
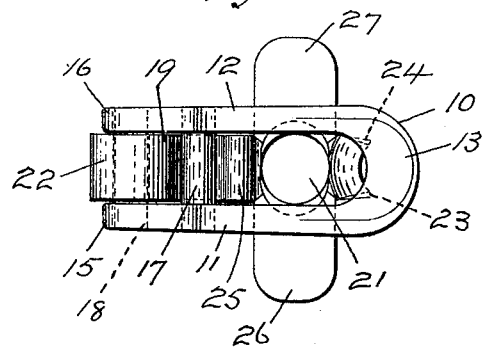
Figure 3:
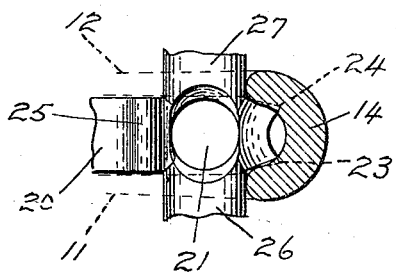

In the drawing, Figure 1 is a side elevation of one form of clutch embodying our invention as employed for detachably connecting the ends of a line. Fig. 2 is a top plan of the clutch, and Fig. 3 is a fragmentary sectional view taken on the line II—II of Fig. 1.

The clutch has a supporting member 10 which is substantially U-shaped to provide two spaced parallel arms 11 and 12, and a curved bridging part, as 13, at one end of the arms. Integrally formed with the lower portion of the bridge 13 and also integral with the contiguous parts of the arms 11 and 12 of the supporting member is a substantially U-shaped depending flange 14. The other end portions of the arms 11 and 12 are correspondingly curved downwardly and bent longitudinally to provide spaced parallel extensions 15 and 16 which are disposed on different relative planes to the arms. Between the arms 11 and 12 at the juncture thereof with the extensions 15 and 16 is a pin, or stop 17, and also between said extensions adjacent to their free ends is provided a pin 18.

Coöperating with the supporting member 10 for detachably and adjustably connecting the ends of a line together, a gripping element, or tongue, as 19, is provided. The gripping element, or tongue 19 has a bar 20 which is preferably of a width slightly less than the width of the space between the arms 11 and 12, and between the extensions 15 and 16, and intermediate the ends of said bar is an aperture 21. On one end of the bar 20 is a hook, as 22, which is guided over the pin 18 between the extensions 15 and 16 for removably attaching the gripping element, or tongue 19 to the supporting member 10 to permit the tongue to be swung downwardly and upwardly with relation to the supporting member. The opposite end of the bar 20 extends between the U-shaped depending flange 14 of the supporting member 10 when the tongue is swung toward said member, and the central part of this end of the bar is cut-out to provide two teeth 23 and 24 adapted to be moved into close proximity to the inner surface of the U-shaped depending flange 14 of the supporting member. Projecting upwardly from the bar 20 is a finger 25 which is guided inwardly and outwardly from between the arms 11 and 12 of the supporting member when the bar is accordingly swung upon its pivot, and said finger is spaced from the hook 22 a sufficient distance so that the pin or stop 17 of the supporting member will pass therebetween for limiting the upward movement of the bar. In order to permit the tongue 19 to be conveniently swung to open or closed positions relatively to the supporting member, extending laterally in opposite directions from the bar 20 are two lugs 26 and 27.

In employing the clutch for detachably and adjustably connecting the end portions of a line, one end of the line, as 28, is guided between the arms 11 and 12 of the supporting member, and the line is passed over the finger 25 of the tongue 19. The end portion 28 of the line is then directed through the aperture 21 of the bar 20, and a knot is tied upon this end of the line to hold it against displacement to the bar 20. The other end portion, as 29, of the line is passed downwardly between the arms 11 and 12 and through the U-shaped depending flange 14 of the supporting member. The bar 20 is then swung upwardly for the teeth 23 and 24 to engage the line, which in turn will be tightly clamped between the bar and the U-shaped depending flange so that the force of the pull on the line will tend to tighten the engagement of these parts therewith. To adjust the clutch upon the line for shortening or lengthening it, the bar 20 is swung from its engagement with the line by forcing the lugs 26 and 27 thereof downwardly, and the supporting member 10 is then suitable adjusted upon the end portion 29 of the line, after which it is clamped between the bar 20 and the depending flange 14 as above described.

In the foregoing description we have embodied the preferred form of our invention, but we do not wish to be understood as limiting ourselves thereto, as we are aware that modifications may be made therein without departing from the principle, or sacrificing any of the advantages of this invention, therefore we reserve to ourselves the right to make such changes as fairly fall within the scope of the appended claims.

Having thus described our invention, we claim as new and desire to secure by Letters Patent:—

1. A line clutch of the character described, comprising a substantially U-shaped supporting member, a pin provided between the arms of the supporting member adjacent to the free ends thereof, a bar having a hook on one of its ends, the hook being guided over said pin for removably pivoting the bar to the supporting member so as to be swung to and from said supporting member, said bar having an aperture therethrough for passage of one end of a line to permit the line to be held against displacement thereto, a finger projecting upwardly from the bar and movably disposed between the arms of the supporting member so that this end of the line will press thereagainst, a stop provided between the arms of the supporting member for limiting the upward movement of the finger, a plurality of teeth provided upon the other end of the bar for coöperating with the curved end of the supporting member to allow the second end portion of a line to be detachably clamped therebetween, and lugs extending laterally from said bar to permit the bar to be manually swung upon its pivot.

2. In a line clutch, a supporting member having two parallel arms connected at one end by a curved portion, and the opposite end thereof being connected by a transverse pin, said arms having a second transverse pin disposed therethrough intermediate its ends at about the central portion thereof and adapted to serve as a stop, and a co-acting member having a hook adapted to engage the pin in the end of the supporting member, said co-acting member being movably fitted between the arms of the supporting member, and having an aperture to permit a line to be connected to the co-acting member, said member having also a projecting finger adapted to extend beyond the second pin between said arms so as to receive the tension of the line, whereby the co-acting member is caused to bear against the stop provided in the supporting member said co-acting member having also a plurality of teeth adapted to engage the line in the curved portion of the supporting member whereby the line will be held therein, substantially as shown and described.

This specification signed and witnessed this third day of November A. D. 1913.

WILLIAM KECKEISSEN.
FRANK J. REILLY.

Witnesses:
  ROBT. B. ABBOTT,
  M. DERMODY.

Copies of this patent may be obtained for five cents each, by addressing the "Commissioner of Patents, Washington, D. C."